Feb. 9, 1960        A. RODER        2,924,305
SHOCK ABSORBERS
Filed Aug. 12, 1957

Inventor:
A. Roder
By Glascock Downing Seebold
Attys.

United States Patent Office 2,924,305
Patented Feb. 9, 1960

2,924,305

SHOCK ABSORBERS

Albert Roder, Heilbronn (Neckar), Germany, assignor to NSU Werke A.G., Neckarsulm, Wurttemberg, Germany Application August 12, 1957, Serial No. 677,520

Claims priority, application Germany August 27, 1956

1 Claim. (Cl. 188—88)

The present invention is directed to improvements in telescopic shock absorbers for vehicles, particularly motor vehicles, and this application is a continuation-in-part of my prior filed application Serial No. 615,616 filed October 12, 1956, and entitled "Telescopic Shock Absorber," now patented under No. 2,867,298, dated January 6, 1959.

As pointed out in said prior filed application, the shock absorber of the invention is directed to what is known as a single-tube type so as to permit the use of a large piston diameter in relation to the over-all diameter of the shock absorber, and one which includes a storage chamber portion within the main body of the shock absorber together with resilient means for continuously applying pressure to the oil or liquid in the storage chamber.

In said prior application is specifically disclosed an arrangement in which the fluid in the storage chamber is acted upon by an annular spring biased piston.

The present invention provides a considerable simplification of this, of itself, entirely sound suggestion by the expedient, that in the storage chamber there is enclosed in lieu of the spring-supported piston specifically illustrated in said prior application an elastic cushion consisting of a gaseous fluid (for instance an air cushion). In addition, packing means are provided, which entirely prevent the escape of the air out of the storage chamber.

Additionally, further packing means embracing the reciprocating piston rod may be very useful.

The invention is also based on the recognition of the fact, that, when the shock absorber is in operation, the excess of oil escaping from the high pressure chamber, which returns again and again in a pulsating manner, is with certainty prevented from escaping into the atmosphere from the storage chamber, as the existing packing surfaces are only under low pressure and come in contact only with oil, but not with the enclosed air cushion.

This results in extremely reliable operation with very simple construction.

In order to avoid difficulties during filling or unforseen shifting of position during transport, the invention further provides, that the partition separating the high pressure chamber from the storage chamber is recessed, hollowed out or the like, on the face thereof adjacent the high pressure chamber and around the piston rod, for enabling any escaped air to return to the storage chamber.

Further details of the invention will be gathered from the following description of a constructional example illustrated in the accompanying drawing, in which.

Figure 1:
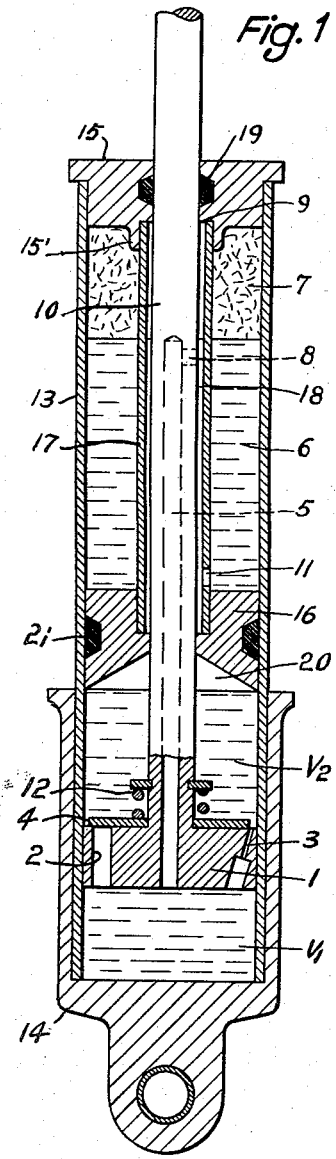
Figure 1 is a longitudinal section through a shock absorber according to the invention and with most of the piston rod being shown in elevation.

The construction according to Figure 1 corresponds as regards its main features to the construction illustrated in my prior application.

Thus, the shock absorber includes a cylindrical casing 13 closed at one end by a closure member 14 from which projects an attaching lug adapted to be connected to a vehicle part. The opposite end of the cylinder accommodates a bored closure plug 15, and a bored partition 16 separates the interior of the cylinder into two portions. The lower portion constituting a piston accommodating portion and the upper portion constituting a storage chamber portion. The piston 1 in the lower portion is provided with ports 2 and 3 through which fluid is displaced, in response to movement of the piston due to shock, from one side of the piston to the other. The piston rod 10 extends from one face of the piston through the bore in the partition 16 through the storage chamber portion, through the bore in the closure 15 and terminates exteriorly of the cylinder for attachment by means not shown to another vehicle part. The liquid containing chambers adjacent the opposite faces of the piston are denoted at $V_1$ and $V_2$. The bore or port 3 through the piston which is restricted on that end that communicates with chamber $V_2$, and a flap valve 4 is urged by a spring 12 to normally close port 2. The valve 4, however, opens when the piston 1 moves toward closure 14, and closes on the reverse movement of the piston.

A sleeve element 17 having a greater diameter or transverse dimension than the diameter or transverse dimension of the piston rod 10 surrounds the piston rod and is socketed at one end within an enlargement of the bore through the partition 16, and at its other end is socketed within an annular extension 15' of the closure 15. Within the storage chamber portion is enclosed an elastic cushion 7 of air or other gaseous fluid. The compressibility characteristics of this elastic cushion ensuring sufficient elasticity during operation. The remainder of the storage chamber portion 6 accommodates the liquid. The storage chamber is in constant uninterrupted communication with the chamber $V_1$ by way of a port 11 in the sleeve 17 and an axial duct 5 through the piston and extending along the piston rod to communicate with a transverse bore 8 that opens into the annular space 18 between the exterior of the piston rod and the interior of the sleeve 17.

In the operation of the shock absorber with piston rod 10 and thus the piston 1 being displaced toward closure 14, oil flows from space $V_1$ through bores 2 and 3 into space $V_2$. As pointed out in my prior application, the space $V_2$ that accommodates the piston rod has a volumetric capacity smaller by the volume of the piston rod than space $V_1$, therefore, a portion of the oil from space $V_1$ flows through bores 5 and 8, annular space 18 and bore 11 into the storage chamber and applies a comprehensive force on the gaseous cushion 7. During the reverse stroke, the piston 1 moves toward the partition 16, flap valve 4 closes bore 2 and oil flows from space $V_2$ into space $V_1$ through bore 3. Since one end of this bore 3 is restricted, the flow of oil into space $V_1$ is throttled and the desired damping effect is obtained. Since the volumetric capacity of space $V_1$ is larger by the volume of the piston rod than space $V_2$, a portion of the oil from chamber 6 is forced by the elastic expansion action of the air cushion 7 to flow back into space $V_1$.

Therefore, during operation, the oil in effect fluctuates and according to the direction of motion of piston 1, oil will either flow into the storage chamber 6 or reversely. In the instance where oil is forced out of the storage chamber through the ducts in the piston rod, it will arrive in the vicinity of the upper end of the annular space 18 without causing any disadvantage. In any case, the air of the air cushion will be prevented from escaping to the exterior through the annular space 18. The oil, owing to its viscosity, assists the sealing effect. Additional packing means at 19 are provided around the piston rod to further assist in preventing any leakage of the air to the exterior of the cylinder.

Figure 2:
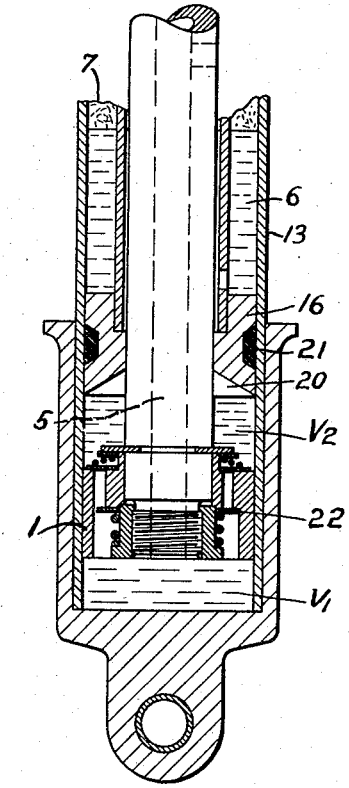
Figure 2 is a fragmentary view of a modified form, also in longitudinal section.

Figure 2 illustrates a modification of only the lower portion of Figure 1 and includes a throttle valve 22 for creating a resistance to the escaping of oil from chamber $V_2$ into chamber $V_1$. The throttle valve serves the main purpose of compensating for changes of condition caused by temperature variations.

Further, in both forms of the invention the face of the partition 16 directed toward chamber $V_2$, the high pressure side of the piston, is provided with a conical recess 20 surrounding the piston rod so that any imprisoned air can, due to movement of the piston rod, be returned toward the storage chamber. In addition, a packing 21 is associated with the exterior of the partition for further sealing purposes.

I claim:

In a shock absorber, a cylinder, a partition separating the interior of the cylinder into a piston accommodating portion and a liquid storage chamber portion, a piston reciprocable in said piston accommodating portion and having ports therethrough permitting displacement of liquid from one side of the piston to the other, a piston rod extending from one face of the piston through the storage chamber portion and exteriorly of the cylinder, said partition having a bore therethrough accommodating the piston rod, a sleeve element within the storage chamber portion, surrounding the piston rod and having a transverse dimension greater than the transverse dimension of the piston rod so as to define an annular space between the exterior of the piston rod and the interior of the sleeve element, at least one port in the sleeve element providing communication between the storage chamber portion and said annular space, said piston and rod having duct means therethrough providing constant uninterrupted communication between the said annular space and that portion of the cylinder adjacent the face of the piston that is remote from the storage chamber and which constitutes the low pressure compartment of the cylinder, one end of said sleeve element being connected to said partition, the face of said partition directed toward the piston having a recess therein to enable any escaped air to return along the piston rod toward the storage chamber, and an elastic gaseous cushion in the storage chamber between the liquid therein and the end of the cylinder remote from the piston for applying pressure to the interior of the storage chamber whereby when the piston moves in a direction away from the storage chamber, a quantity of liquid is displaced into the storage chamber and upon reverse movement of the piston a quantity of liquid is returned from the storage chamber into the low pressure compartment of the cylinder.

References Cited in the file of this patent

UNITED STATES PATENTS

| | | |
|---|---|---|
| 1,387,081 | Springer | Aug. 9, 1921 |
| 2,314,404 | Katcher | Mar. 23, 1943 |
| 2,410,176 | Magrum | Oct. 29, 1946 |
| 2,636,726 | Mercier | Apr. 28, 1953 |
| 2,735,670 | Schultze | Feb. 21, 1956 |
| 2,867,298 | Roder | Jan. 6, 1959 |

FOREIGN PATENTS

| | | |
|---|---|---|
| 771,899 | Great Britain | Apr. 3, 1957 |